US012779579B2

(12) United States Patent
Sleath et al.

(10) Patent No.: US 12,779,579 B2
(45) Date of Patent: Nov. 3, 2026

(54) METHOD AND APPARATUS FOR FRICTION-BASED REPAIR OF LEAK PATHS IN DIE-CAST PARTS

(71) Applicant: Spartan Light Metal Products, Inc., St. Louis, MO (US)

(72) Inventors: Christopher A. Sleath, Ortonville, MI (US); Scott P. Meyer, Waterloo, IL (US); Nigel J. Doerge, Sparta, IL (US); Samuel Holdsworth, Cambridge (GB); Oliver Watts, Cambridge (GB); Nathan Horrex, Cambridge (GB); Russell Wymer, Jr., Millbury, OH (US); Timothy R. Rutkowski, Jr., Rossford, OH (US)

(73) Assignee: Spartan Light Metal Products, Inc., St. Louis, MO (US)

( * ) Notice: Subject to any disclaimer, the term of this patent is extended or adjusted under 35 U.S.C. 154(b) by 0 days.

(21) Appl. No.: 19/395,122

(22) Filed: Nov. 20, 2025

(65) Prior Publication Data

US 2026/0145264 A1 May 28, 2026

Related U.S. Application Data

(60) Provisional application No. 63/724,539, filed on Nov. 25, 2024.

(51) Int. Cl.
*B23K 20/00* (2006.01)
*B23K 20/12* (2006.01)
(Continued)

(52) U.S. Cl.
CPC ........ *B23K 20/129* (2013.01); *B23K 20/1215* (2013.01); *B23K 20/1255* (2013.01); *B23P 6/04* (2013.01); *B23K 2101/04* (2018.08)

(58) Field of Classification Search
CPC ...... B23K 2101/04; B23K 20/12–1295; B23P 6/04
(Continued)

(56) References Cited

U.S. PATENT DOCUMENTS 2,917,819 A * 12/1959 Britton ...................... B23P 6/04 29/458
2,951,506 A * 9/1960 Diperstein ................ B23P 6/04 29/402.12
(Continued)

FOREIGN PATENT DOCUMENTS

CN 101678499 A * 3/2010 ............. B23K 20/12
CN 103567697 A * 2/2014 ................ B23P 6/04
(Continued)

OTHER PUBLICATIONS

The International Search Report for Application No. PCT/US2025/056274, dated Apr. 10, 2026, 2 pages.

*Primary Examiner* — Kiley S Stoner
(74) *Attorney, Agent, or Firm* — WARNER NORCROSS + JUDD LLP

(57) ABSTRACT

A method of repairing a leak path formed through a casting defect in a die-cast part includes inserting a plug into threads of a bore formed in the die-cast part. A leak path is formed from the bore through the casting defect. The head of the plug may be sheared off, leaving a remaining length of the plug within the bore. The remaining length of the plug within the bore is pilot drilled to leave a shell of donor material around a wall of the bore. A mechanical bit is then operated within the bore and through the shell of donor material to generate plasticized local material along an inner surface of the bore. The plasticized local material flows into the casting defect to seal the leak path and produces a clean, sealed hole that is ready for tapping.

21 Claims, 11 Drawing Sheets

(51) Int. Cl.
*B23P 6/04* (2006.01)
*B23K 101/04* (2006.01)

(58) Field of Classification Search
USPC ..................... 228/119, 112.1–114.5, 2.1–2.3, 228/141.1–174
See application file for complete search history.

(56) References Cited

U.S. PATENT DOCUMENTS

| | | | | | |
|---|---|---|---|---|---|
| 4,034,462 | A * | 7/1977 | Hentges | B22D 7/066 | 29/402.14 |
| 4,428,214 | A | 1/1984 | Head, Jr. et al. | | |
| 4,454,741 | A | 6/1984 | Hoogenboom | | |
| 4,599,781 | A * | 7/1986 | Diperstein | B23P 6/04 | 29/402.11 |
| 4,662,806 | A * | 5/1987 | Reed | B23P 6/04 | 411/2 |
| 4,824,279 | A * | 4/1989 | Casazza | F16B 35/041 | 403/294 |
| 4,845,828 | A * | 7/1989 | Reed | B23P 6/04 | 29/402.15 |
| 5,379,505 | A * | 1/1995 | Reed | B23G 5/06 | 29/888.011 |
| 5,971,252 | A * | 10/1999 | Rosen | B23K 20/1265 | 228/119 |
| 6,213,379 | B1 * | 4/2001 | Takeshita | B23K 20/122 | 228/2.1 |
| 6,880,743 | B1 * | 4/2005 | Coletta | B23K 20/1295 | 228/2.1 |
| 10,272,519 | B2 * | 4/2019 | Wieland | B23K 35/02 | |
| 2001/0022925 | A1 * | 9/2001 | Reed | F16B 37/122 | 411/178 |
| 2003/0034379 | A1 * | 2/2003 | Jackson | F01D 5/005 | 228/119 |
| 2003/0217452 | A1 | 11/2003 | Talwar et al. | | |
| 2005/0040209 | A1 * | 2/2005 | Stotler | B23K 20/123 | 228/2.1 |
| 2005/0178816 | A1 * | 8/2005 | Stevenson | B23K 20/127 | 228/2.1 |
| 2009/0261146 | A1 * | 10/2009 | Hou | B23K 20/124 | 228/2.1 |
| 2014/0123470 | A1 * | 5/2014 | Miles | B23K 20/127 | 228/2.3 |
| 2017/0304933 | A1 | 10/2017 | Miles et al. | | |
| 2018/0085867 | A1 | 3/2018 | Lin et al. | | |
| 2019/0039119 | A1 * | 2/2019 | Li | B21J 15/025 | |
| 2019/0111513 | A1 * | 4/2019 | Rose | B23K 20/128 | |
| 2020/0384560 | A1 * | 12/2020 | Rebbecchi, Jr. | B23K 1/20 | |
| 2021/0069838 | A1 | 3/2021 | Ano et al. | | |
| 2024/0326344 | A1 * | 10/2024 | Mourad | B29C 65/069 | |
| 2024/0359273 | A1 * | 10/2024 | Reed | B23P 6/04 | |
| 2025/0035226 | A1 * | 1/2025 | Miller | B23K 20/123 | |
| 2026/0145264 | A1 * | 5/2026 | Sleath | B23K 20/129 | |
| 2026/0145282 | A1 * | 5/2026 | Sleath | B23K 20/129 | |

FOREIGN PATENT DOCUMENTS

| | | | | |
|---|---|---|---|---|
| CN | 104439685 | A * | 3/2015 | B23K 20/12 |
| CN | 104507630 | B * | 10/2016 | B23K 20/129 |
| CN | 106670643 | A * | 5/2017 | B23K 20/26 |
| CN | 110640392 | A * | 1/2020 | B23K 20/26 |
| CN | 107775182 | B * | 5/2020 | B23K 20/1225 |
| CN | 112496670 | A * | 3/2021 | B23P 6/04 |
| CN | 115476030 | A * | 12/2022 | B23K 20/1255 |
| CN | 116197518 | A * | 6/2023 | B23K 20/12 |
| DE | 102008049055 | A1 * | 6/2010 | B23P 6/005 |
| DE | 102018103326 | A1 * | 8/2019 | B23K 20/1295 |
| EP | 1503089 | A1 * | 2/2005 | B21J 15/048 |
| EP | 2018241 | B1 | 1/2012 | |
| JP | 2006015383 | A | 1/2006 | |
| JP | 2006239734 | A | 9/2006 | |
| JP | 2007275980 | A | 10/2007 | |
| SU | 1303352 | A1 * | 4/1987 | B23P 6/04 |
| WO | 2013133709 | A1 | 9/2013 | |

* cited by examiner

METHOD AND APPARATUS FOR FRICTION-BASED REPAIR OF LEAK PATHS IN DIE-CAST PARTS

CROSS REFERENCE TO RELATED APPLICATIONS

This application claims the benefit of U.S. Provisional Application No. 63/724,539, filed Nov. 25, 2024, the disclosure of which is incorporated herein by reference in its entirety.

FIELD OF THE INVENTION

The disclosure generally relates to die-cast parts, and more particularly, to sealing leak paths in casting defects at void spaces formed in die-cast parts.

BACKGROUND OF THE INVENTION

It is known in the art relating to die casting, and particularly to high-pressure die casting, that porosities may be formed in a die-cast part, especially thick sections of the part, from gas entrapment or shrink during the die casting process. When void spaces such as bores are later formed in porous sections of the die-cast part, for example when screw holes are drilled/tapped, a porosity or chain of porosities may connect the screw hole to a passage or chamber within the die-cast part as shown in FIG. 1. Casting defects may also exist along other open spaces within the die-cast part such as channels or passages in the die-cast part. The porosity or chain of porosities thereby forms a leak path from within the die-cast part to the external atmosphere, which may allow for the leakage of fluid from within the die-cast part during use of the part. One method of sealing the leak path from within the screw hole or other bore or opening formed in the die-cast part is to inject a resin into the screw hole or other opening to impregnate the porosities with the resin and thereby form a seal within the screw hole or other opening. However, from a practical standpoint, this method is tedious and time-consuming. Also, this method adds an additional cost to the die-cast part and introduces another material to the die-cast part which may be undesirable. Therefore, a need exists for an improved method of repairing/sealing porosities in die-cast parts.

BRIEF SUMMARY

A method of repairing a leak path formed through a casting defect in a die-cast part is provided. The method includes inserting a plug into first threads of a bore formed in a die-cast part having a casting defect. The bore is adjacent and connected to the casting defect, and a leak path is formed from the bore through the casting defect. The method further includes the step of pilot drilling the plug within the bore to leave a shell of donor material around a wall of the bore. The method further includes operating a mechanical bit within the bore and through the shell of donor material to generate plasticized local material along an inner surface of the bore. The plasticized local material flows into the casting defect to seal the leak path and produces a clean, sealed hole that is ready for tapping and that includes a plasticized layer along the inner surface within the bore.

In specific embodiments, the casting defect is a porosity feature formed in the die-cast part.

In specific embodiments, the mechanical bit plasticizes both the donor material and material forming the die-cast part adjacent to the donor material, and the mechanical bit stirs together the plasticized donor material and material of the die-cast part to form the plasticized layer.

In specific embodiments, the plug is a shear bolt that is threaded into the first threads of the bore.

In particular embodiments, the shear bolt includes a head and a shaft extending from the head, and the method further comprises the step of shearing off the head of the shear bolt, leaving a remaining length of the shaft of the shear bolt within the bore.

In specific embodiments, the method further comprises shearing off an excess length of the shaft of the shear bolt with the head of the shear bolt, the excess length extending outwardly from the bore.

In specific embodiments, the method further includes the step of operating a cutting or forming tap within the bore to form new, second threads in the clean, sealed hole for receiving a fastener.

In particular embodiments, the new, second threads are at least as strong as the first threads.

In specific embodiments, the step of operating a mechanical bit within the bore includes: providing a tool including the mechanical bit, the mechanical bit including a shank and an elongated body extending from the shank in an axial direction; actuating the tool to rotate the mechanical bit; and advancing the mechanical bit in at least one of the axial direction or a radial direction into the bore and through the shell of donor material. Friction between the mechanical bit, the donor material, and material of the die-cast part generates heat to plasticize the donor material and local die-cast material adjacent the donor material.

In particular embodiments, the tool forms a plasticized layer along the surface within the bore.

In particular embodiments, the tool forms a plasticized layer around the entirety of the bore.

In particular embodiments, the mechanical bit is rotated at a rate of up to 15000 rpm, optionally of up to 3000 rpm.

In particular embodiments, the mechanical bit is advanced at a rate of between 10 mm/min and 500 mm/min, optionally up to 200 mm/min.

In particular embodiments, the elongated body of the mechanical bit includes a working portion, the working portion including a head at a distal end.

In certain embodiments, the head is rounded.

In certain embodiments, the head includes a plurality of lobes.

In certain embodiments, the lobes are curved in the axial direction of the body.

In certain embodiments, the lobes are helical.

In certain embodiments, the lobes are curved in a radial direction of the body.

In certain embodiments, the working portion includes a cylindrical section and an increased diameter section. The increased diameter section is adjacent the cylindrical section, and the increased diameter section includes the head.

In certain embodiments, the increased diameter section includes one or more helical lobes.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
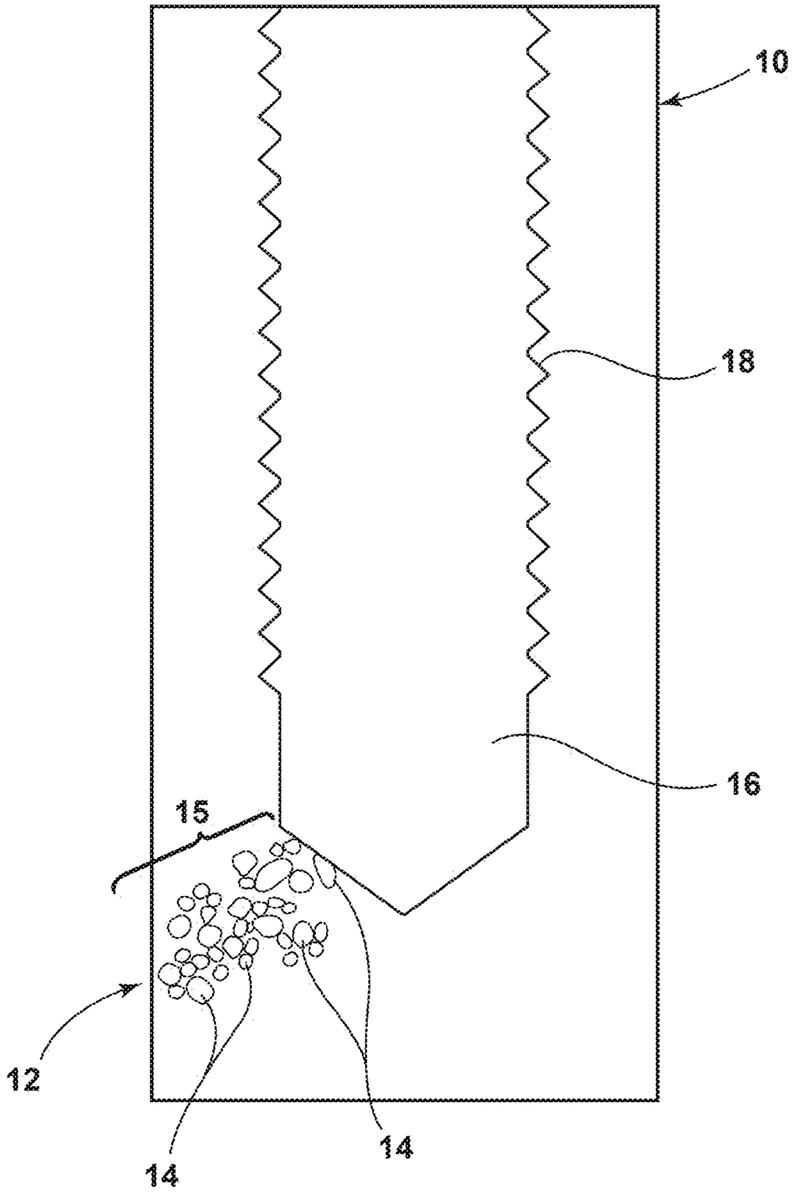
FIG. 1 is a schematic view of a section of a die-cast part illustrating a chain of porosities in the die-cast part that form a leak path from a drilled/tapped screw hole.
Figure 2:
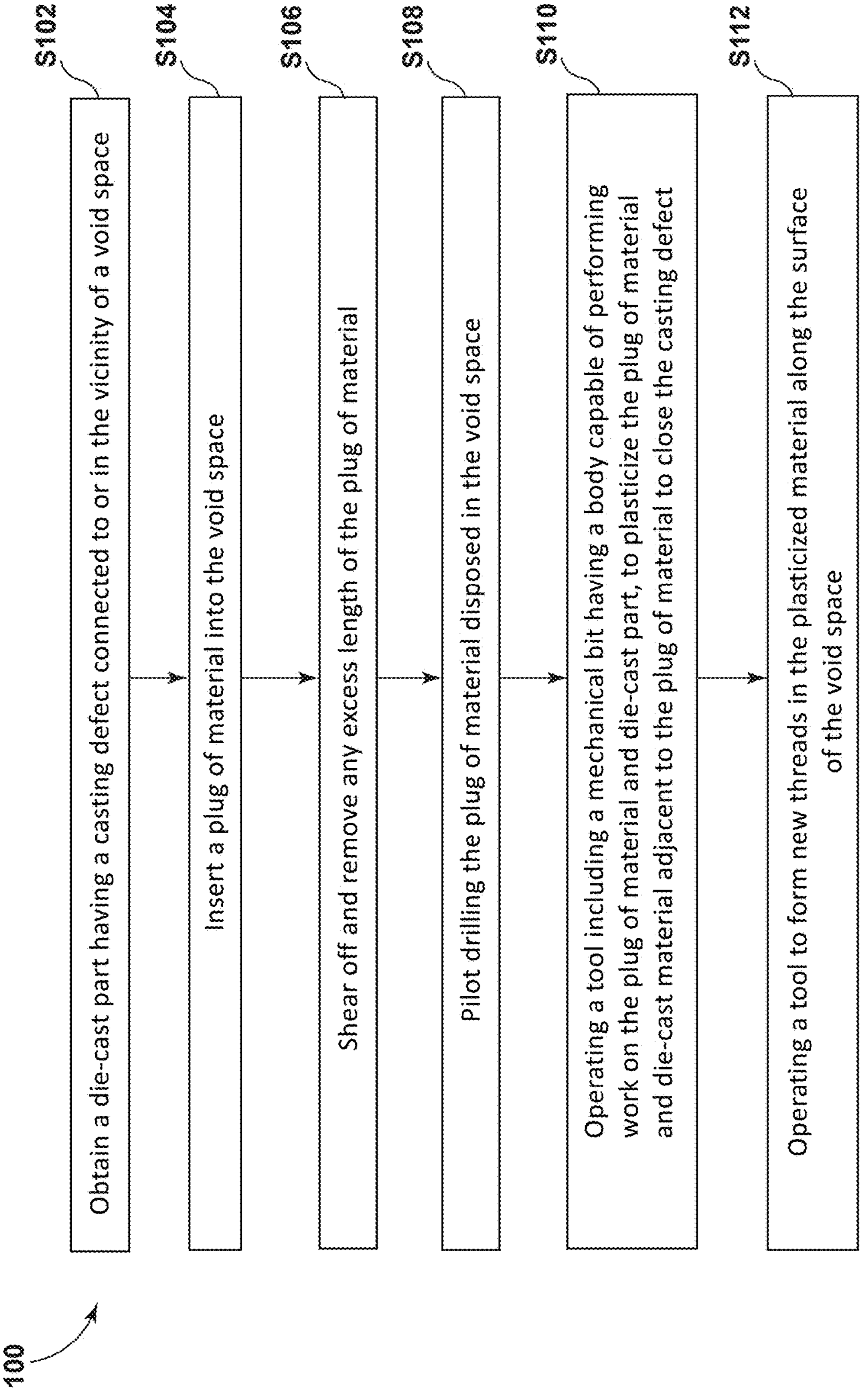
FIG. 2 is flowchart of a re-fill mill method of repairing a leak path formed through a casting defect in a die-cast part in accordance with embodiments of the disclosure.

A method of repairing a leak path formed through a casting defect in a die-cast part and a tool for use in the method are provided. The method and associated tool allow for the quick and low-cost repair of leak paths caused by casting defects at and around screw holes and other fastener bores formed in the die-cast part. The method also modifies and refines the material structure surrounding and forming the screw hole or other fastener bore, thereby providing screw/fastener threads that are as strong or stronger than the original threads prior to performance of the method. Each step of the method is separately discussed below.

With reference to FIGS. 1-8, at step S102 the method 100 first includes providing or obtaining a die-cast part 10 having a casting defect 12. In some embodiments, the material forming the die-cast part may be an aluminum-based alloy. In other embodiments, the material may be a magnesium-based alloy. In exemplary embodiments, the casting defect is a porosity feature (one or a group of porosities 14) formed in the die-cast part that interconnect to form a leak path 15 for fluid flow from an interior of the die-cast part to an exterior of the die-cast part as shown schematically in FIG. 1. However, the casting defect may be another void space or series of void spaces undesirably formed in the die-cast part during the casting process. The casting defect is at or in the vicinity of a desired void space such as a screw hole 16 or other fastener bore pre-formed in the outer surface of the die-cast part (hereinafter the void space may be referred to interchangeably as a hole or bore by way of example of a void space adapted to receive a fastener). By "pre-formed," it is meant that the screw hole or other fastener bore is formed in the die-cast part during the casting process, or the screw hole or other fastener bore has been drilled, bored, or the like into the die-cast part at a time prior to the start of the method such that it is pre-existing. For example, when a screw hole such as but not limited to a M8 or M6-sized screw hole is formed in the die-cast part adjacent to and/or in the vicinity of the porosity feature, the screw hole exposes the porosity feature to the external environment, thereby forming an undesired opening along the wall that defines the screw hole and connecting the screw hole to the porosity feature. Further, when the group of porosities are disposed in a chain, the chain forms a leak path from within an internal space of the die-cast part to the screw hole such that when the die-cast part is put into use, fluid may leak from the internal space of the die-cast part to the screw hole. A chain of porosities also may form a leak path from one passage to another, thereby leading to fluid cross-talk between the passages due to fluid leaking from one passage to the other. The casting defect is therefore a subsurface defect formed within the die-cast part and opened to the external atmosphere when a hole or bore is drilled into the die-cast part, and the casting defects are subsurface defects that are adjacent to and/or in the vicinity of an internal channel or passage formed within the die-cast part. In various embodiments, when the die-cast part having the casting defect is obtained, leakage of fluid at the screw hole or other fastener bore via the leak path has already been observed; however, observance of actual fluid leaks via the leak paths is not required.

Figure 3:
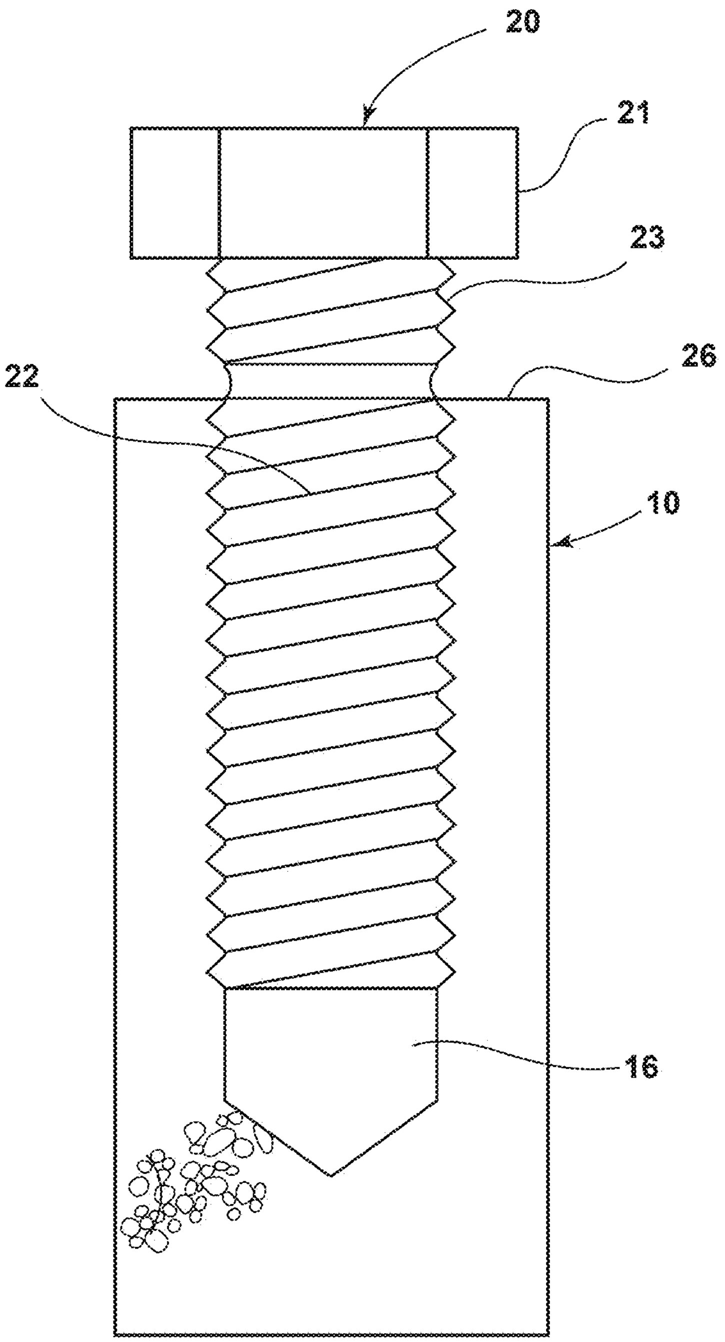
FIG. 3 is a schematic view of a section of the die-cast part illustrating insertion of a plug in the form of a shear bolt into the screw hole in the die-cast part in accordance with the method.

At step S104, the method 100 next includes inserting a plug of material into the screw hole 16 or other fastener bore formed in the die-cast part 10 as shown schematically in FIG. 3. In exemplary embodiments, the plug of material is a shear bolt, set screw, or similar that is threaded into first, original fastener threads 18 that have previously been formed in the screw hole in the die-cast part. Alternatively, the plug of material may be another form of material that is sized and shaped to fill at least an upper region of the screw hole. In the example of the plug of material being a shear bolt 20, the shear bolt includes a head 21 and a threaded, cylindrical shaft 22 that extends longitudinally from the head. The threaded shaft is threaded into the screw hole. Depending on certain factors such as the depth of the threads in the screw hole and the length of the shaft of the shear bolt, the entire shaft may be threaded into the screw hole, or when the shear bolt is bottomed out in the screw hole, an excess length 23 of the shaft of the shear bolt may extend outwardly from the screw hole such that the head of the shear bolt is spaced from the outer surface 26 of the die-cast part. In either case, the shear bolt extends deeply into the screw hole and fills the circular cross-sectional area of the screw hole. The shear bolt may be formed of aluminum, but in other embodiments may be another material depending on its compatibility with the metal or metal alloy that forms the die-cast part.

Figure 4:
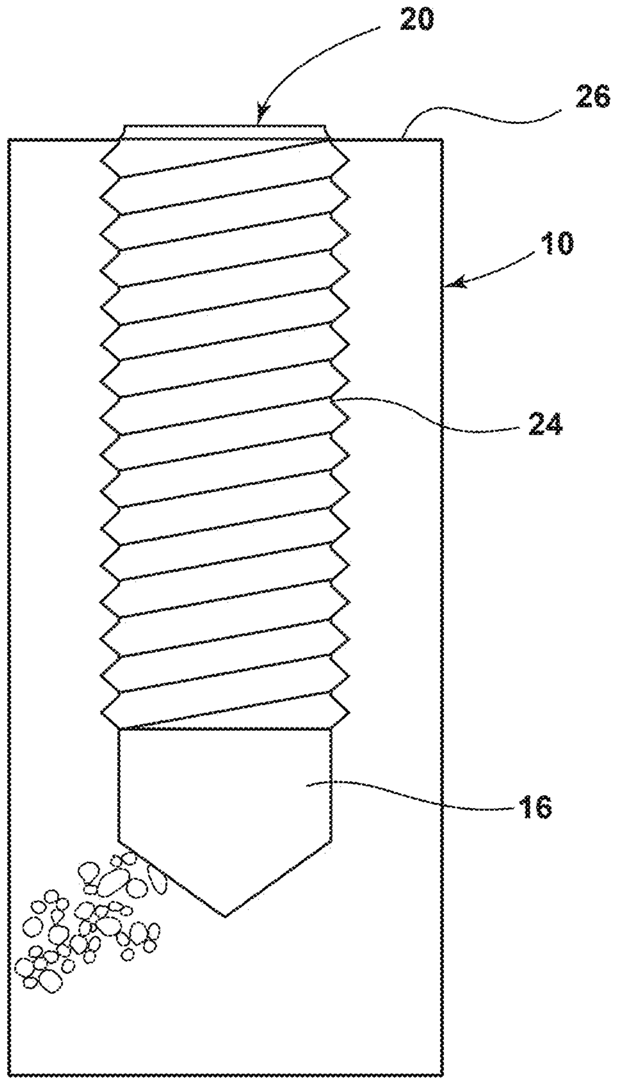
FIG. 4 is a schematic view of a section of the die-cast part illustrating removal of the head and an excess length of the shear bolt in accordance with the method.

Next, optionally at step S106 of the method 100 the head 21 of the shear bolt 20 is sheared off and removed, and any excess length 23 of the shaft of the shear bolt that extends outwardly from screw hole 16 is sheared off and removed with the head as shown schematically in FIGS. 3 and 4. For example, once the shear bolt is bottomed out in the screw hole, the head and any excess length may be snapped off by applying the critical shear torque to the shear bolt. Thus, a remaining length 24 of the shaft of the shear bolt is left within the screw hole, with the outer end of the shaft being generally or approximately flush with the outer surface 26 of the die-cast part 10 surrounding the screw hole 16. Alternatively, in the case that the plug of material is some other physical form of material that fills the screw hole, the plug of material may entirely fit into the screw hole such that no portion of the plug need be removed, or if a portion of the plug extends outwardly from the screw hole, that outwardly extending portion may be removed by any suitable means including but not limited to shearing or cutting.

Figure 5:
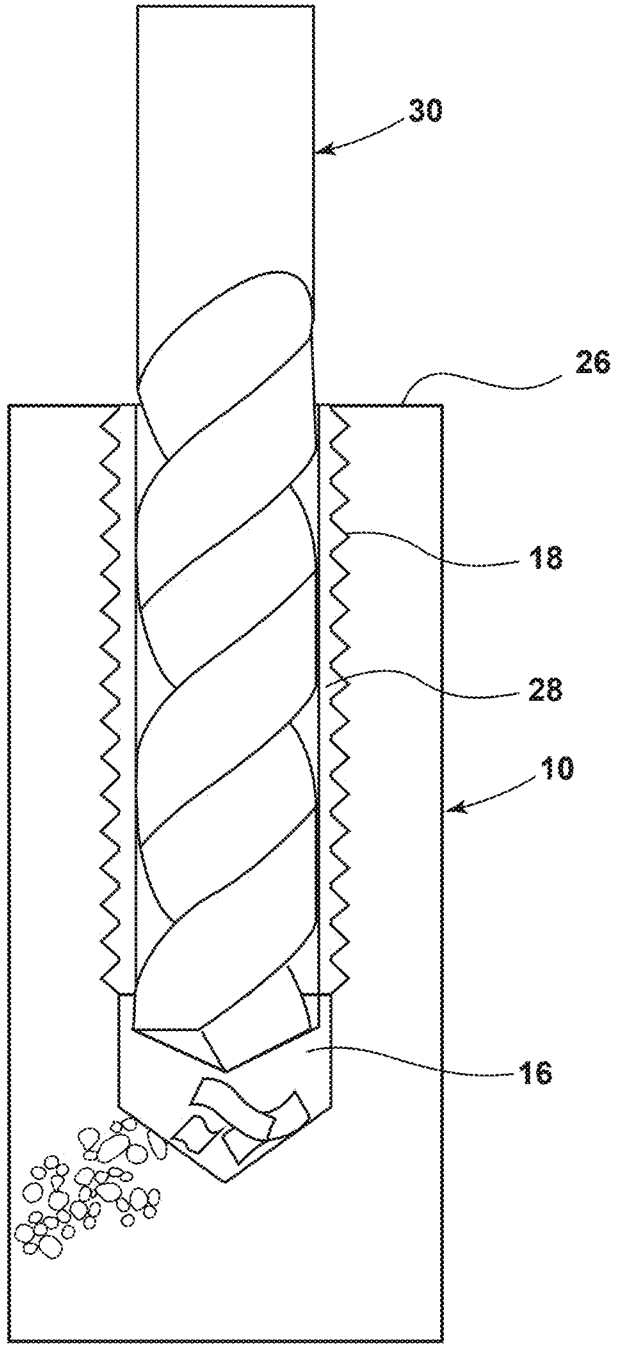
FIG. 5 is a schematic view of a section of the die-cast part illustrating pilot drilling of the shear bolt to form a shell of donor material in the screw hole in accordance with the method.

At step S108, the method 100 next includes pilot drilling the remaining length 24 of the shaft of the shear bolt within the screw hole to leave a cylindrical shell of donor material 28 around a wall of the screw hole 16 as shown schematically in FIG. 5. The cylindrical shell of donor material covers the original screw threads 18 that were previously formed in the screw hole of the die-cast part 10. The pilot drilling may be accomplished using a drill bit 30 or other suitable bit capable of forming a pilot hole through the remaining length of the shaft of the shear bolt that is left in the screw hole in the previous step of the method.

Figure 6:
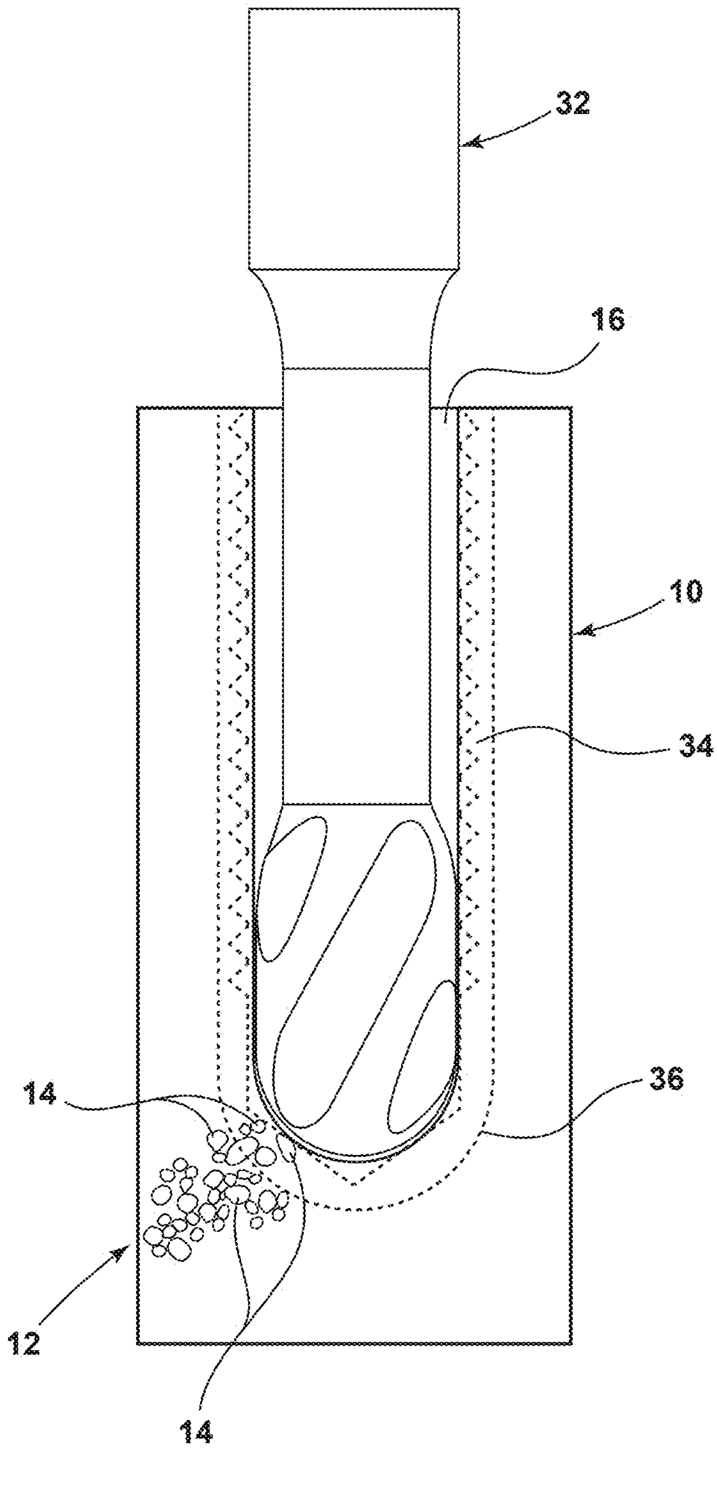
FIG. 6 is a schematic view of a section of the die-cast part illustrating friction milling of the screw hole having the shell of donor material to plasticize the donor material and adjacent die-cast material thereby sealing the leak path and forming a clean refinished screw hole in accordance with the method.

Subsequently, at step S110 of the method 100, a mechanical bit 32 is operated within the screw hole 16 and through the cylindrical shell of donor material 28 to generate plasticized local material 34 along an inner surface of the screw hole as shown schematically in FIG. 6. The plasticized local material flows into the porosities 14 of the casting defect 12 to seal the leak path, and the plasticized material produces a clean, sealed hole that is ready for tapping and that includes a plasticized layer 36 along the inner surface within the screw hole. More particularly, the mechanical bit plasticizes both the donor material and material of the die-cast part adjacent to the donor material, and the mechanical bit stirs together the plasticized donor material and the material of the die-cast part to form the plasticized layer over the entirety of the surface of the screw hole.

Further, in exemplary embodiments, the step of operating the mechanical bit 32 includes providing, obtaining, and/or utilizing a specific tool. The tool, which is described in greater detail below, generally includes a shank and an elongated body, the body extending axially from the shank in an axial direction along the central axis of the shank. The body constitutes a working portion of the tool that performs work on the die-cast part, while the shank is receivable in a chuck or other similar receiver of an actuator device such as a drill or similar that is capable of rotating and/or advancing the mechanical bit (rotational, translational, and/or orbital movement in the axial and/or radial directions). The die-cast part and actuator device are positioned such that the mechanical bit is aligned with the screw hole, and particularly the pilot hole formed through the cylindrical shell of donor material of the shear bolt. The actuator device is actuated to rotate the mechanical bit about its longitudinal axis. The rotational speed of the mechanical bit may be up to approximately 3000 rpm or more, optionally up to 4000 rpm, optionally up to 5000 rpm, optionally up to 6000 rpm, optionally up to 7000 rpm, optionally up to 8000 rpm, optionally up to 9000 rpm, optionally up to 10000 rpm, optionally up to 11000 rpm, optionally up to 12000 rpm, optionally up to 13000 rpm, optionally up to 14000 rpm, optionally up to 15000 rpm, optionally in the range of 2900 to 3100 rpm, optionally in the range of 2800 to 3200 rpm, optionally in the range of 2700 to 3300 rpm, optionally in the range of 2600 to 3400 rpm, optionally in the range of 2500 to 3500 rpm, optionally in the range of 2900 to 3000 rpm, optionally in the range of 2800 to 3000 rpm, optionally in the range of 2700 to 3000 rpm, optionally in the range of 2600 to 3000 rpm, optionally in the range of 2500 to 3000 rpm, optionally in the range of 3000 to 3100 rpm, optionally in the range of 3000 to 3200 rpm, optionally in the range of 3000 to 3300 rpm, optionally in the range of 3000 to 3400 rpm, optionally in the range of 3000 to 3500 rpm optionally in the range of 2500 to 15000 rpm, optionally in the range of 2500 to 14000 rpm, optionally in the range of 2500 to 13000 rpm, optionally in the range of 2500 to 12000 rpm, optionally in the range of 2500 to 11000 rpm, optionally in the range of 2500 to 10000 rpm, optionally in the range of 2500 to 9000 rpm, optionally in the range of 2500 to 8000 rpm, optionally in the range of 2500 to 7000 rpm, optionally in the range of 2500 to 6000 rpm, optionally in the range of 2500 to 5000 rpm, optionally in the range of 2500 to 4000 rpm. The mechanical bit is advanced into the cylindrical shell of donor material in either or both of the axial direction and the radial direction. While rotating the mechanical bit, a first option is to advance the mechanical bit in the axial direction by moving the actuator device linearly in a direction parallel to the axis of the mechanical bit (plunging movement). Alternatively, a second option is to advance the mechanical bit in the radially direction by orbiting the mechanical bit about a center point that may be concentric with a center point of the cylindrical shell of donor material and the screw hole such that the mechanical bit traverses the surface of the cylindrical shell and the screw hole as it orbits about the center point (orbiting movement). Further, a third option is to advance the mechanical bit in a combination of both plunging movement and orbiting movement. For example, the mechanical bit may be advanced linearly in the axial direction such that the mechanical bit is slowly plunged into the screw hole and through the cylindrical shell of donor material in the screw hole. The rate of advancement of the mechanical bit may be up to approximately 200 mm/minute or greater, optionally up to 220 mm/minute, optionally up to 240 mm/minute, optionally up to 260 mm/minute, optionally up to 280 mm/minute, optionally up to 300 mm/minute, optionally up to 320 mm/minute, optionally up to 340 mm/minute, optionally up to 360 mm/minute, optionally up to 380 mm/minute, optionally up to 400 mm/minute, optionally up to 420 mm/minute, optionally up to 440 mm/minute, optionally up to 460 mm/minute, optionally up to 480 mm/minute, optionally up to 500 mm/minute, optionally between 10 and 200 mm/minute, optionally between 20 and 200 mm/minute, optionally between 30 and 200 mm/minute, optionally between 40 and 200 mm/minute, optionally between 50 and 200 mm/minute, optionally between 60 and 200 mm/minute, optionally between 70 and 200 mm/minute, optionally between 80 and 200 mm/minute, optionally between 90 and 200 mm/minute, optionally between 100 and 200 mm/minute, optionally between 110 and 200 mm/minute, optionally between 120 and 200 mm/minute, optionally between 130 and 200 mm/minute, optionally between 140 and 200 mm/minute, optionally between 150 and 200 mm/minute, optionally between 160 and 200 mm/minute, optionally between 170 and 200 mm/minute, optionally between 180 and 200 mm/minute, optionally between 190 and 200 mm/minute, optionally between 50 mm/minute and 500 mm/minute, optionally between 100 mm/minute and 500 mm/minute, optionally between 150 mm/minute and 500 mm/minute, optionally between 200 mm/minute and 500 mm/minute, optionally between 50 mm/minute and 400 mm/minute, optionally between 50 mm/minute and 300 mm/minute, optionally between 50 mm/minute and 250 mm/minute, optionally approximately 10 mm/minute, optionally approximately 20 mm/minute, optionally approximately 30 mm/minute, optionally approximately 50 mm/minute, optionally approximately 100 mm/minute, optionally approximately 150 mm/minute, optionally approximately 200 mm/minute.

Figure 7:
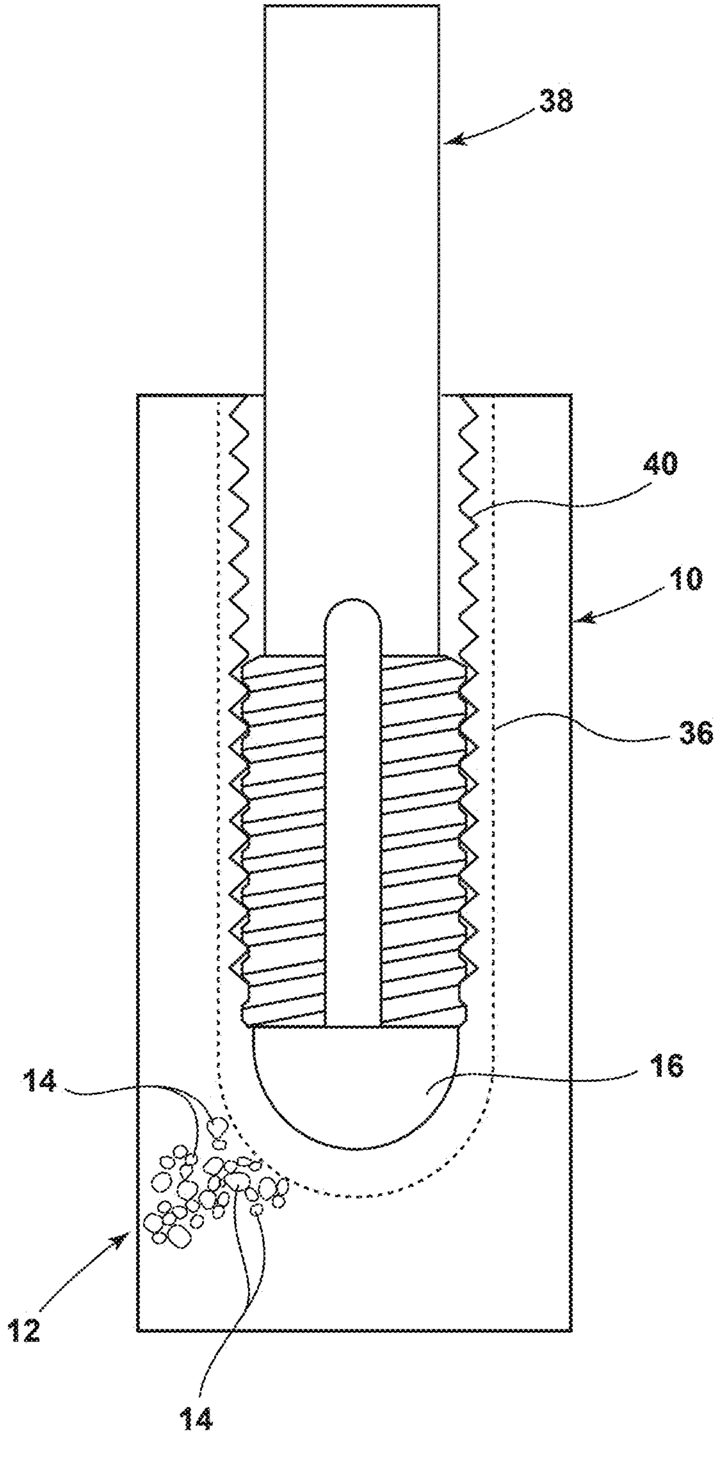
FIG. 7 is a schematic view of a section of the die-cast part illustrating threading of the refinished screw hole in accordance with the method.
Figure 8:
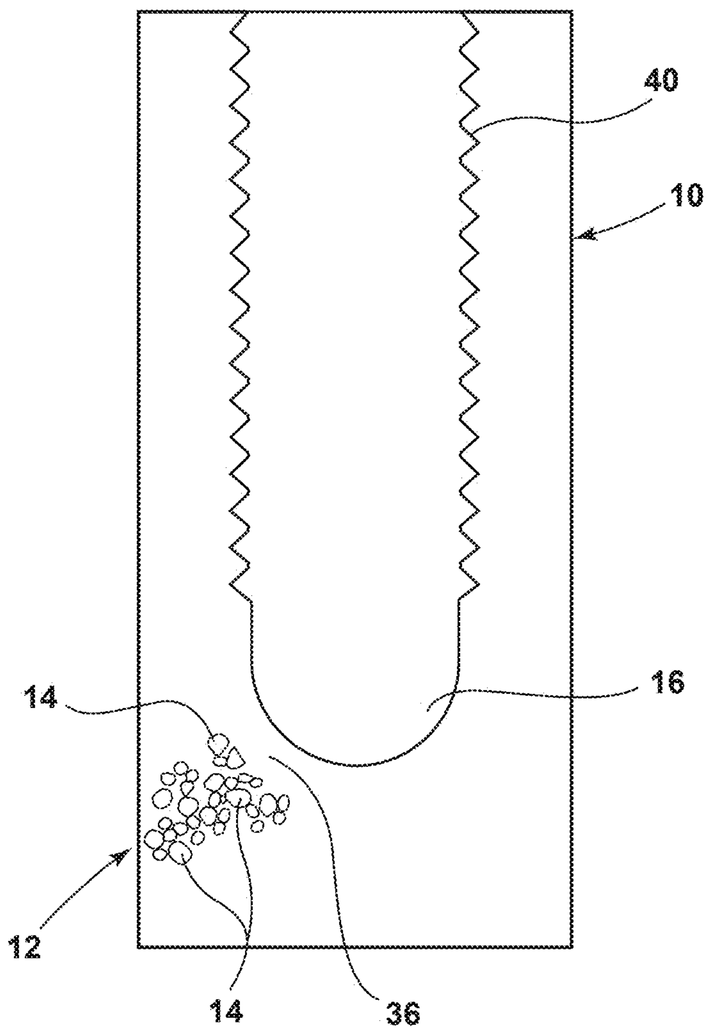
FIG. 8 is a schematic view of a section of the die-cast part illustrating the final, sealed, re-threaded screw hole in accordance with the method.

During rotation and advancement of the mechanical bit, friction between the mechanical bit, the cylindrical shell of donor material, and the material of the die-cast part adjacent to the cylindrical shell forming the cylindrical wall of the screw hole, generates heat that plasticizes the donor material and the local die-cast material of the die-cast part (material along the surface of the screw hole and in the close vicinity of the screw hole) adjacent the donor material. The plasticized material 34 closes the casting defect in the vicinity of the surface of the screw hole and forms a sealing layer or zone between the screw hole and rest of the die-cast material surrounding the screw hole as shown schematically in FIGS. 6 and 7. The plasticized local material 34 forms a layer 36 along the surface defining the screw hole and also may surround the entirety of the screw hole. Additionally, in various embodiments the plasticized local material also flows into one or more of the porosities 14 of the casting defect 12, thereby closing and sealing the casting defect 12 from the screw hole 16 as can be seen in FIGS. 7 and 8. Once the mechanical bit has been sufficiently and/or fully advanced into the screw hole and has completed work on the screw hole, the mechanical bit is retracted and removed from the repaired screw hole. The repaired screw hole is a clean, finished hole that is also sized for tapping new threads for a new fastener.

With reference next to FIG. 7, at step S112 the method 100 next includes operating another tool such as, by way of example, a cutting or forming tap 38 that is adapted to form threads within the screw hole 16. The cutting or forming tap is actuated within the plasticized screw hole to form new, second threads 40 in the clean, sealed hole for receiving a fastener such as, by way of example, another M8 or M6 bolt. The resulting newly-threaded screw hole 16 with plasticized sealing layer 36 is shown schematically in FIG. 8 and is ready for use. As a result of the refined grain structure formed by plasticizing and mixing of the donor material and the adjacent die-cast material, the newly formed threads are as strong as or stronger than the original threads.

After repeated use of the mechanical bit through multiple iterations of the steps above, donor material and/or die-cast material may become built up around the working portion of the mechanical bit which may alter the performance of the mechanical bit. Therefore, an optional additional step after removing the mechanical bit from the screw hole of the die-cast part is to clean and remove material from the working portion of the mechanical bit. The cleaning step is not particularly limited as long as it is capable of removing excess material from the mechanical bit. For example, the working portion of the mechanical bit may be cleaned using a lathe the sand away the excess material and/or to cut some of the excess material so that it can be knocked off the mechanical bit. The cleaning step may be performed after each iteration of the method steps with a particular mechanical bit, or may be performed after a number of iterations using the same mechanical bit, such as, for example, three iterations, five iterations, eight iterations, or ten iterations.

Figure 9B:
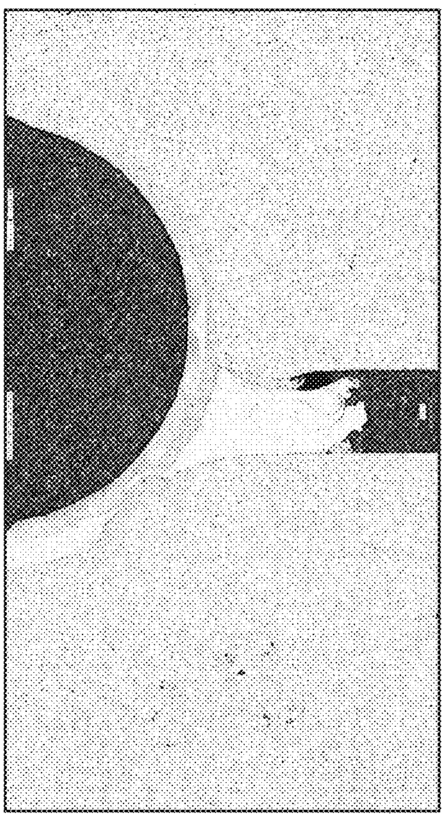
FIG. 9B is an enlarged view of a lower portion of the cross-section of the test workpiece of FIG. 9A.
Figure 9A:
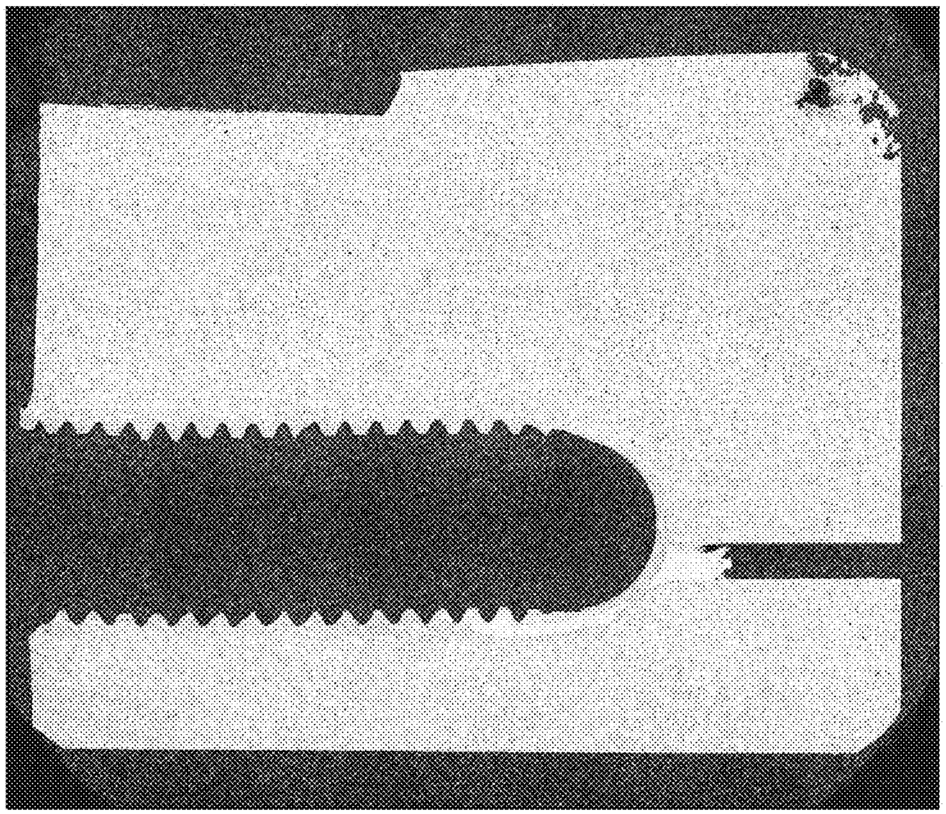
FIG. 9A is a pictorial view of a cross-section of a test workpiece after performance of the repair method in accordance with various embodiments of the disclosure.

Turning next to FIGS. 9A and 9B, in a laboratory simulation, a simulated void space in the form of a M8 bolt hole was formed in a workpiece of die-cast aluminum. A small hole of approximately 1.7 mm diameter was drilled in the bottom of the screw hole to simulate a leak path from the screw hole. The above steps S102 through S112 were performed to repair the screw hole, and friction between the mechanical bit, the donor material, and the screw hole wall plasticized the donor material and local die-cast material surrounding the screw hole. After performance of the method, a section of the die-case workpiece was taken to reveal the resulting structure in the vicinity of the screw hole as shown in the images in FIGS. 9A and 9B. Plasticized material flowed into the leak path that was connected to the screw hole, and the grain structure of the die-cast material is much finer in local region of the screw hole and sealed leak path compared with the grain structure of the rest of the workpiece.

Figure 10:
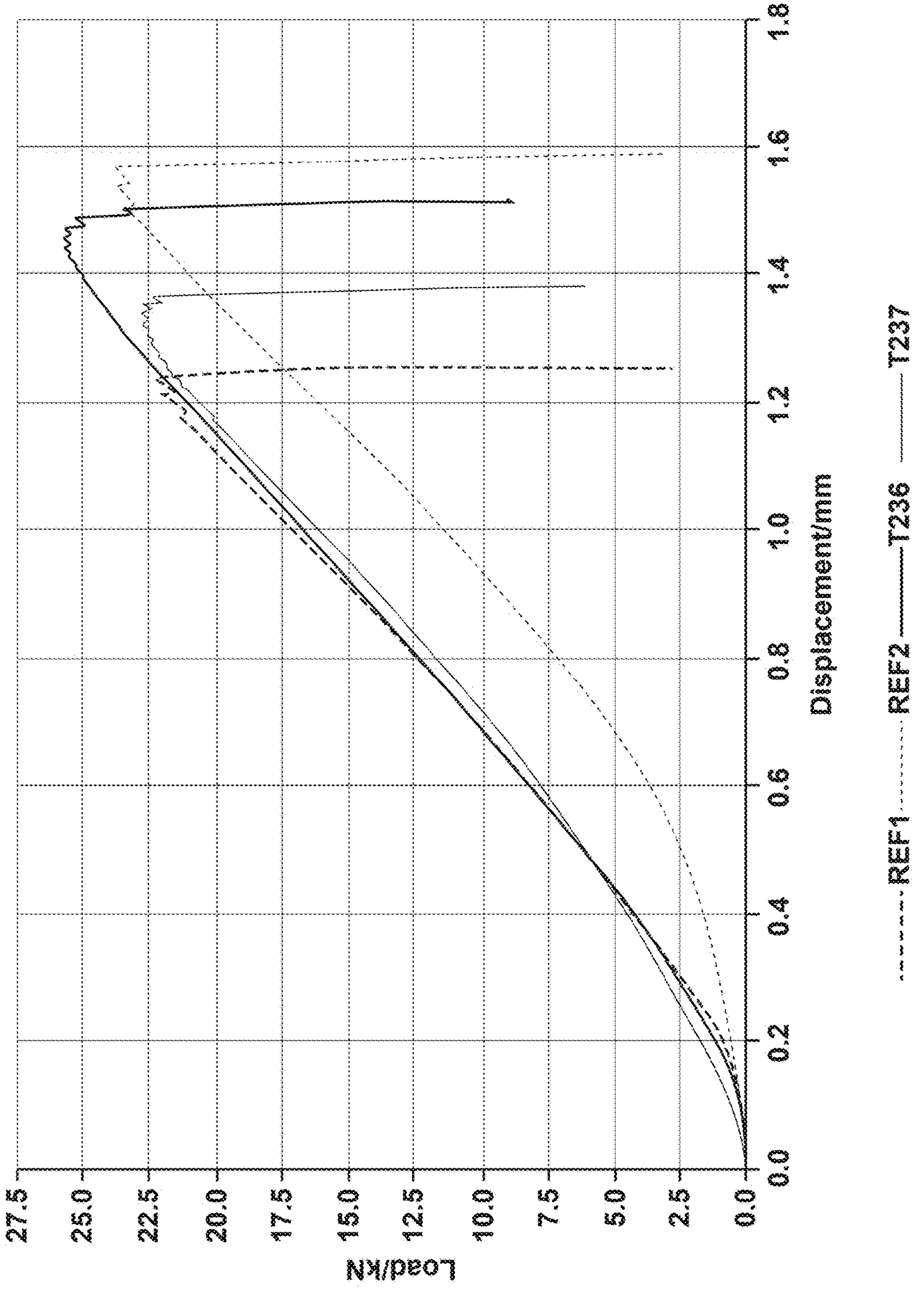
FIG. 10 is a graph of fastener pullout tests performed on fasteners fastened in original threads in accordance with the prior art and on fasteners fastened in re-fill milled holes formed in accordance with various embodiments of the repair method.

Further, with reference to FIG. 10, pullout tests were performed on screws that were threaded into originally threaded screw holes in accordance with the prior art (i.e., those that were not repaired according to the method described above). Pullout tests were also performed on screws that were threaded into screw holes that had undergone the re-fill mill repair/rework process in accordance with embodiments of the method described above. The results of the pullout tests revealed that the threads formed according to the present method (T236 and T237) had a strength equivalent to or greater than the threads in accordance with the prior art (REF1 and REF2), illustrated by their load capacity.

The mechanical bit used to perform the method, and particularly the working portion of the mechanical bit, may have a variety of different geometrical configurations. Generally, the body of the bit is configured to generate plasticized local material along a surface defining a void space in a die-cast part, such that the plasticized local material closes a casting defect formed in the die-cast part. The mechanical bit is preferably formed of a material that has a high toughness at elevated temperatures. For example, the mechanical bit may be formed of a high-temperature tool steel, a nickel-based super alloy, or other similar material having high strength/hardness/durability at elevated temperatures. Specific examples of materials suitable for the mechanical bit may include, but are not limited to, high-speed steel (HSS), W360 steel, and MP159 nickel alloy.

Figure 11:
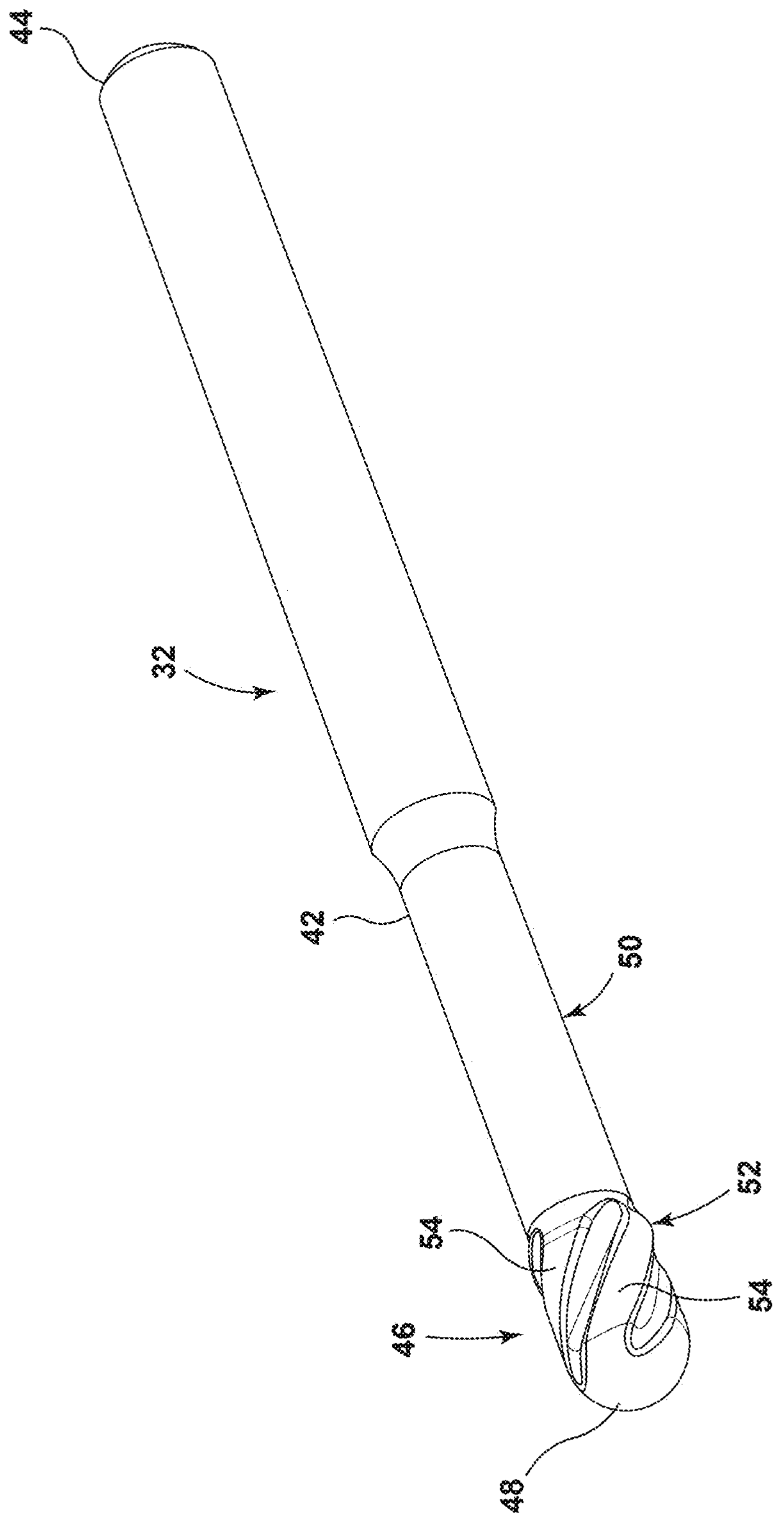
FIG. 11 is a perspective view of a mechanical bit of a tool in accordance with specific embodiments of the disclosure.

In exemplary embodiments such as shown in FIG. 11, the mechanical bit 32 includes a body 42 and a shank 44. The body 42 is elongated, extends axially from the shank 44. The body 42 also may be referred to as a “probe.” The body 42 includes a working portion 46 that performs work on a workpiece such as a die-cast part. The working portion 46 includes a head 48 at a terminal, distal end that is distal from the shank 44. More particularly, the working portion 46 includes a cylindrical section 50 and an increased diameter section 52, the increased diameter section being adjacent the cylindrical section 50, and the increased diameter section 52 including the head 48 and forms a lollipop feature. The increased diameter section 52 including the head 48 is shorter in length than the cylindrical section 50, such as, for example, approximately one-third, one-quarter, or one-fifth of the length of the cylindrical section. The head 48 is rounded, and the increased diameter section 52 also includes one or a plurality of lobes 54. The lobes may be curved in one or both of the axial direction of the body 42. For example, the lobes 54 are shown as curved in both directions, and as such the lobes are helical (spiraled) in shape. By way of example only, the shank 44 may have a diameter of approximately 10.0 mm, the cylindrical section 50 may have a diameter of approximately 6.0 to 6.3 mm, the working portion 46 may have a length of approximately 25 mm, the increased diameter section 52 may have a diameter in a range of approximately 6.6 to 6.8 mm and may have a length of approximately 10.0 mm, and each lobe 54 may have a depth of approximately 0.4 mm and a pitch of approximately 22 mm. As the mechanical bit 32 is shown by way of example, it should be understood that the method 100 may be performed with other similar mechanical bits including a working portion that is capable of performing friction milling.

The various mechanical bit geometries and surface features including the lobes and lollipop aid in managing the plasticized material formed by operation of the bit within the screw hole to balance the generation of frictional heat with the flow of some material out of the screw hole. The mechanical bit must be capable of generating heat along the walls of the screw hole to plasticize the local material, while at the same time not generating excess pressure that could cause the walls of the screw hole to bulge out. The mechanical bit geometries and surface features balance frictional heat generation with removing material from the screw hole.

In alternative embodiments, the mechanical bit may have a head that includes a blunt surface. Particularly, in this embodiment, the head is rounded and terminates in a tip that is a flat surface in a plane that is perpendicular to the axial direction of the mechanical bit. Alternatively, the head of the mechanical bit may be rounded such as a hemispherical shape without a flat surface. This configuration may also be referred to as a "bull nose" configuration. In other embodiments that include one or more lobes, each lobe of the mechanical bit may be flat in both the axial and radial directions, and each lobe also may not be tapered in the axial direction of the body such that the "depth" of the lobe is generally constant. Alternatively, each lobe of the mechanical bit may be curved in the radial direction. In other alternatives, each lobe of the mechanical bit may be tapered in the axial direction of the body such that the "depth" of each lobe increases in a direction from the shank to the head. Stated differently, in the tapered configuration, the size of the cross-section of the working portion decreases from the shank to the head. In yet other embodiments, the mechanical bit may have lobes that are helical (spiraled) in the axial direction of the body. Each lobe is also curved in the radial direction. In another embodiment, the working portion of the mechanical bit may have three helical lobes that are flat in the radial direction. In yet other embodiments, the working portion of the mechanical bit may include threads from the shank to the head, and the head may be rounded. In still other embodiments, the working portion of the mechanical bit may include helical lobes and threads that overlap generally the entirety of the helical lobes. Further, the threads may turn in the same direction as the helical lobes, such as both being clockwise or both being counterclockwise. In yet other embodiments, the threads of the mechanical bit may turn in an opposite direction as the lobes, such as one being clockwise and the other being counterclockwise. Further, the threads may only overlap a portion of the helical lobes.

In various embodiments, the mechanical bit may be solid or alternatively may be hollow. In particular embodiments, hollow mechanical bits may be used for wide screw holes such as large diameter bores. A hollow, tubular mechanical bit geometry may enhance frictional heating of local material within the screw hole or other void space, by reducing the amount of heat energy lost to heating of the material that forms the mechanical bit. In other words, a solid mechanical bit has more conductive material that can absorb heat in comparison to a hollow mechanical bit. In yet other further embodiments, the mechanical bit may be of a single-piece construction, or alternatively may be a multi-piece bit including inserts and/or other component(s) that are assembled together. In particular embodiments, multi-piece mechanical bis may be used for wide void spaces such as large diameter bores.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of repairing a leak path formed through a casting defect in a die-cast part, the method comprising:
- inserting a plug into first threads of a bore formed in a die-cast part having a casting defect, the bore being adjacent and connected to the casting defect, and a leak path being formed from the bore through the casting defect;
- pilot drilling the plug within the bore to leave a shell of donor material around a wall of the bore; and
- operating a mechanical bit within the bore and through the shell of donor material to generate plasticized local material along an inner surface of the bore wherein the plasticized local material flows into the casting defect to seal the leak path, and the plasticized material produces a clean, sealed hole that is ready for tapping and that includes a plasticized layer along the inner surface within the bore.

2. The method of claim 1, wherein the casting defect is a porosity feature formed in the die-cast part.

3. The method of claim 1, wherein the mechanical bit plasticizes both the donor material and material forming the die-cast part adjacent to the donor material, and the mechanical bit stirs together the plasticized donor material and material of the die-cast part to form the plasticized layer.

4. The method of claim 1, wherein the plug is a shear bolt that is threaded into the first threads of the bore.

5. The method of claim 4, wherein the shear bolt includes a head and a shaft extending from the head, and the method further comprises the step of shearing off the head of the shear bolt, leaving a remaining length of the shaft of the shear bolt within the bore.

6. The method of claim 5, further comprising shearing off an excess length of the shaft of the shear bolt with the head of the shear bolt, the excess length extending outwardly from the bore.

7. The method of claim 1, further comprising the step of operating a cutting or forming tap within the bore to form new, second threads in the clean, sealed hole for receiving a fastener.

8. The method of claim 7, wherein the new, second threads are at least as strong as the first threads.

9. The method of claim 1, wherein the step of operating a mechanical bit within the bore comprises:
- providing a tool including the mechanical bit, the mechanical bit including a shank and an elongated body extending from the shank in an axial direction;
- actuating the tool to rotate the mechanical bit; and
- advancing the mechanical bit in at least one of the axial direction or a radial direction into the bore and through the shell of donor material;
- wherein friction between the mechanical bit, the donor material, and material of the die-cast part generates heat to plasticize the donor material and local die-cast material adjacent the donor material.

10. The method of claim 9, wherein the tool forms a plasticized layer along the surface within the bore.

11. The method of claim 9, wherein the tool forms a plasticized layer around the entirety of the bore.

12. The method of claim 9, wherein the mechanical bit is rotated at a rate of up to 15000 rpm.

13. The method of claim 9, wherein the mechanical bit is advanced at a rate of between 10 mm/min and 500 mm/min.

14. The method of claim 9, wherein the elongated body of the mechanical bit includes a working portion, the working portion including a head at a distal end.

15. The method of claim 14, wherein the head is rounded.

16. The method of claim 14, wherein the head includes a plurality of lobes.

17. The method of claim 16, wherein the lobes are curved in the axial direction of the body.

18. The method of claim 17, wherein the lobes are helical.

19. The method of claim 16, wherein the lobes are curved in a radial direction of the body.

20. The method of claim 14, wherein the working portion includes a cylindrical section and an increased diameter section, the increased diameter section being adjacent the cylindrical section, and the increased diameter section comprising the head.

21. The method of claim 20, wherein the increased diameter section includes one or more helical lobes.

* * * * *